(12) United States Patent
Takada et al.

(10) Patent No.: US 12,395,047 B2
(45) Date of Patent: Aug. 19, 2025

(54) INVERTER-INTEGRATED ELECTRIC COMPRESSOR

(71) Applicant: SANDEN CORPORATION, Isesaki (JP)

(72) Inventors: Kohei Takada, Isesaki (JP); Koji Kobayashi, Isesaki (JP); Atsuhiro Tadenuma, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 238 days.

(21) Appl. No.: 18/035,044

(22) PCT Filed: Nov. 17, 2021

(86) PCT No.: PCT/JP2021/042241
§ 371 (c)(1),
(2) Date: May 2, 2023

(87) PCT Pub. No.: WO2022/107810
PCT Pub. Date: May 27, 2022

(65) Prior Publication Data
US 2023/0402905 A1   Dec. 14, 2023

(30) Foreign Application Priority Data

Nov. 19, 2020 (JP) ................... 2020-192125

(51) Int. Cl.
*H02K 11/33* (2016.01)
*F04B 35/04* (2006.01)
(Continued)

(52) U.S. Cl.
CPC .............. *H02K 11/33* (2016.01); *F04B 35/04* (2013.01); *F04C 29/0085* (2013.01);
(Continued)

(58) Field of Classification Search
CPC ......... H02K 11/33; H02K 11/02; F04B 35/04; F04B 39/00; F04C 29/0085;
(Continued)

(56) References Cited

U.S. PATENT DOCUMENTS

2010/0170294 A1* 7/2010 Nakagami ............. H01L 25/162
62/505

FOREIGN PATENT DOCUMENTS

| JP | 2003-324903 A | 11/2003 |
| JP | 4981483 B2 | 7/2012 |

(Continued)

OTHER PUBLICATIONS

WO-2017163811-A1_translate (Year: 2017).*
Japan Patent Office; International Search Report issued in International Patent Application No. PCT/JP2021/042241, mailed Dec. 28, 2021.
(Continued)

*Primary Examiner* — Tulsidas C Patel
*Assistant Examiner* — Mohammed Ahmed Qureshi
(74) *Attorney, Agent, or Firm* — Baker Botts L.L.P.

(57) ABSTRACT

There is provided an inverter-integrated electric compressor which makes it possible to effectively suppress noise caused by a common mode current while achieving a size reduction. The inverter-integrated electric compressor includes an inverter device 3 which has upper and lower arm switching elements 13 and 16 and applies a three-phase AC output to a motor M. The inverter-integrated electric compressor injuries a control board which controls the switching of the upper and lower arm switching elements 13 and 16, and a bus bar assembly 22 provided to establish wiring among a battery 24, the control board, the upper and lower arm switching elements 13 to 18, and the motor M. A normal mode coil 40, a three-phase common mode coil 41, a ferrite core 42, reflux capacitors 43 and 44, and a snubber circuit 52 are arranged in the bus bar assembly 22.

14 Claims, 14 Drawing Sheets

(51) Int. Cl.
*F04C 29/00* (2006.01)
*H02K 11/02* (2016.01)
*H02M 1/34* (2007.01)
*H02M 7/00* (2006.01)

(52) U.S. Cl.
CPC ............ *H02K 11/02* (2013.01); *H02M 1/348* (2021.05); *H02M 7/003* (2013.01); *F04C 2240/808* (2013.01); *F25B 2400/077* (2013.01)

(58) Field of Classification Search
CPC ............ F04C 2240/808; F04C 18/0215; F04C 2240/803; F04C 23/008; H02M 1/348; H02M 7/003; F25B 2400/077
See application file for complete search history.

(56) References Cited

FOREIGN PATENT DOCUMENTS

| | | |
|---|---|---|
| JP | 5091521 B2 | 12/2012 |
| JP | 2014-058910 A | 4/2014 |
| JP | 2016-160802 A | 9/2016 |
| WO | WO-2017163811 A1 * | 9/2017 .............. F04B 35/04 |

OTHER PUBLICATIONS

Japan Patent Office, Notice of Reasons for Refusal issued in Japanese Patent Application No. 2022-563801, dated Apr. 2, 2024 (6 pages).

* cited by examiner

FIG. 14

INVERTER-INTEGRATED ELECTRIC COMPRESSOR

CROSS-REFERENCE TO RELATED APPLICATIONS

This application is a U.S. National Stage Patent Application under 37 U.S.C. § 371 of International Patent Application No. PCT/JP2021/042241, filed Nov. 17, 2021, which claims the benefit of Japanese Patent Application No. JP 2020-192125, filed Nov. 19, 2020, the disclosures of each of which are incorporated herein by reference in their entirety.

TECHNICAL FIELD

The present invention relates to an inverter-integrated electric compressor having an inverter device which applies a three-phase AC output to a motor.

BACKGROUND ART

An electric compressor used in a vehicle air conditioner has heretofore been required to be downsized to satisfy space saving. Therefore, an electric compressor has been used in which an inverter device for driving a motor by using a switching element is integrally provided in a housing (casing) for accommodating the motor.

In such an inverter-integrated electric compressor, various parasitic couplings (between the motor and the housing, between the switching element and the housing, between the substrate and the housing, etc.) exist. Therefore, a common mode current (noise) which flows out to the housing increases due to a voltage fluctuation accompanying the switching operation of the switching element. Thus, there has heretofore been taken a measure of mounting an EMI filter constituted of a common mode coil and a Y capacitor on a power input unit of a control board, and refluxing the common mode current (noise) flowing out from the switching element to the housing via the parasitic coupling (parasitic capacitance) to achieve a noise reduction (refer to, for example, Patent Document 1).

CITATION LIST

Patent Documents

Patent Document 1: Japanese Patent No. 5091521
Patent Document 2: Japanese Patent No. 4981483

SUMMARY OF THE INVENTION

Problems to be Solved by the Invention

However, in such a conventional configuration, since a path from the switching element, which is a noise source, to the EMI filter becomes a wiring via a screw or the like, the wiring length from the switching element to the EMI filter expands with respect to the common mode current flowing out from the switching element to the housing, and a reflux loop of the common mode current becomes large, so that a filter effect of a Y capacitor (the effect of refluxing the common mode current) cannot be sufficiently obtained. Therefore, a large common mode coil having sufficient impedance must be inserted into the power input unit, which results in being contrary to space saving.

In addition, there has also been proposed a measure of inserting a snubber circuit consisting of a resistor and a capacitor for reducing noise (mainly radio noise) generated by a common mode current (leakage current) in parallel with a switching element (refer to, for example, Patent Document 2). However, since it is mounted on a control board, the control board becomes large in order to secure a sufficient creepage distance required for insulation, which has also been a cause of hindering space saving.

On the other hand, since this type of electric compressor is also required to have seismic performance, a bus bar (wiring member) made by integral molding of resin is used for the connection between the control board and a power supply, the connection between the switching elements, and the connection between the switching element and the motor. Then, in Patent Document 1, a capacitor and a reactor for reducing the ripple of a power supply voltage are integrated into the bus bar.

The present invention has been made to solve the above-mentioned conventional technical problems and aims to provide an inverter-integrated electric compressor capable of effectively suppressing noise due to a common mode current while achieving a size reduction.

Means for Solving the Problems

There is provided an inverter-integrated electric compressor including an inverter device which has a switching element and applies a three-phase AC output to a motor. The inverter-integrated electric compressor includes a control board configured to control switching of the switching element, and a wiring member provided to establish wiring among a DC power supply, the control board, the switching element, and the motor, and is characterized in that elements for noise reduction are arranged in the wiring member.

The inverter-integrated electric compressor of the invention of claim 2 is characterized in that in the above invention, the control board, the wiring member, and the switching element are provided in stacked form.

The inverter-integrated electric compressor of the invention of claim 3 is characterized in that in the above respective inventions, the elements for noise reduction are any of a snubber circuit to reduce noise, a capacitor to reflux an outflowing common mode current to a noise source, a normal mode coil connected between the switching element and the motor, a three-phase common mode coil connected between the switching element and the motor, and a ferrite core connected between the switching element and the motor, or a combination of them, or all of them.

The inverter-integrated electric compressor of the invention of claim 4 is characterized in that in the above invention, the snubber circuit is an individual snubber circuit, or a package snubber circuit.

The inverter-integrated electric compressor of the invention of claim 5 is characterized in that in the invention of claim 3 o 4, the snubber circuit is constituted by a capacitor, or a capacitor and a resistor, or a capacitor, a resistor, and a diode.

The inverter-integrated electric compressor of the invention of claim 6 is characterized in that in the above respective inventions, the wiring member is a bus bar assembly formed by molding a bus bar with a resin.

Advantageous Effect of the Invention

According to the present invention, there is provided an inverter-integrated electric compressor including an inverter device which has a switching element and applies a three-phase AC output to a motor. The inverter-integrated electric compressor includes a control board configured to control switching of the switching element, and a wiring member provided to establish wiring among a DC power supply, the control board, the switching element, and the motor. Elements for noise reduction are arranged in the wiring member. Therefore, it is possible to miniaturize the noise reducing elements mounted on the control board and miniaturize the control board.

In this case, as in the invention of claim 2, in the inverter-integrated electric compressor in which the control board, the wiring member, and the switching element are provided in stacked form, the elements for noise reduction are arranged in the wiring member to form a three-dimensional arrangement, thereby making it possible to achieve a size reduction while ensuring a creepage distance sufficiently.

Incidentally, as in the invention of claim 3, there are considered as the elements for noise reduction, for example, a snubber circuit to reduce noise, a capacitor to reflux an outflowing common mode current to a noise source, a normal mode coil connected between the switching element and the motor, a three-phase common mode coil connected between the switching element and the motor, and a ferrite core connected between the switching element and the motor, etc.

For example, if the capacitor for refluxing the outflowing common mode current to the noise source is arranged in the wiring member, it is possible to flow back the outflowing common mode current to the noise source in a short route. It is possible to suppress noise without inserting a large common mode coil into a power input unit as in the past. Consequently, it is possible to effectively suppress noise while miniaturizing the electric compressor.

Further, for example, even by arranging the three-phase common mode coil connected between the switching element and the motor or the ferrite core connected between the switching element and the motor in the wiring member, it is possible to increase the impedance of a path reaching from the switching element to the housing of the electric compressor via the motor and reduce a common mode current flowing out from the path. Further, a switching surge can be effectively suppressed by arranging the normal mode coil connected between the switching element and the motor in the wiring member. This also eliminates the need to insert a large EMI filter (common mode coil) into the power input unit, thereby making it possible to effectively suppress noise while achieving the miniaturization of the electric compressor.

In particular, unlike the common mode coil, since the normal mode coil does not require the coupling of three-phase lines, it can be arranged separately. There are fewer restrictions on the arrangement of the normal mode coil in the wiring member, and it is easier to be miniaturized than in the case of the common mode coil. Further, since a noise reduction effect is obtained even if the normal mode coil is not inserted in all of the three phases (for example, only two phases), there is an advantage that it is easy to use.

Further, for example, by arranging a snubber circuit for reducing noise in the wiring member, the snubber circuit can be arranged closer to the switching element, and hence a noise attenuation effect can be enhanced.

The snubber circuit in this case includes an individual snubber circuit or a package snubber circuit as in the invention of claim 4.

Further, the snubber circuit is actually comprised of only a capacitor, a capacitor and a resistor, or a capacitor, a resistor, and a diode as in the invention of claim 5.

Furthermore, by constituting the wiring member with a bus bar assembly formed by molding a bus bar with a resin as in the invention of claim 6, earthquake resistance can also be ensured while ensuring insulation.

BRIEF DESCRIPTION OF THE DRAWINGS

FIG. 14 is a view describing an example of snubber circuits.

MODE FOR CARRYING OUT THE INVENTION

Figure 1:
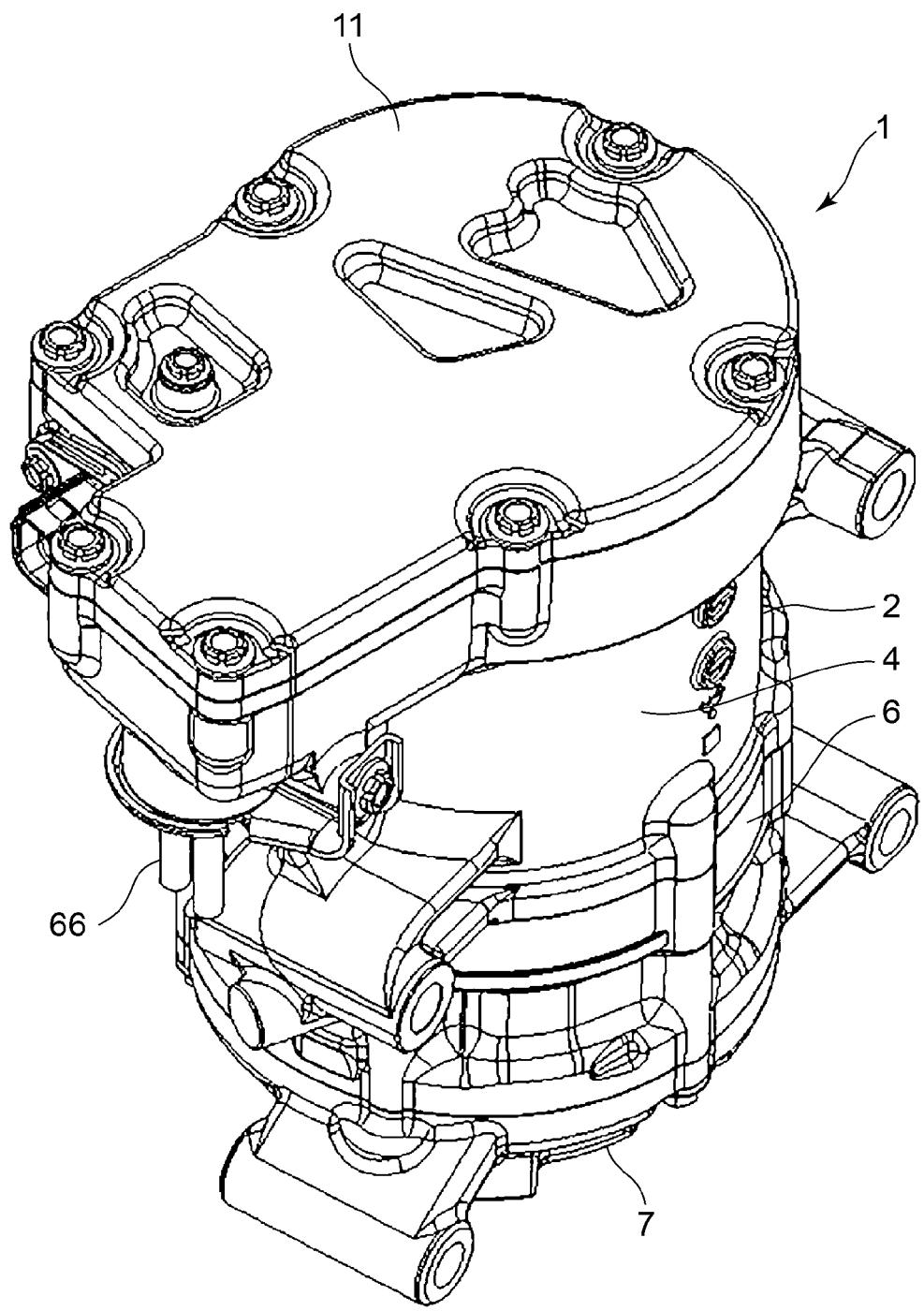
FIG. 1 is a perspective view of an inverter-integrated electric compressor of an embodiment to which the present invention is applied.

Hereinafter, an embodiment of the present invention will be described in detail with reference to the drawings. An inverter-integrated electric compressor 1 according to the embodiment constitutes a part of a refrigerant circuit of an unillustrated vehicle air conditioner and includes a motor M (illustrated in FIGS. 4 and 5), a metal-made (aluminum or iron-made: aluminum-made in the embodiment) housing 2 having built-in a compression mechanism (not illustrated) driven by the motor M, and an inverter device 3 (power conversion device) which applies a three-phase AC output to the motor M to drive the same.

The housing 2 includes a motor housing 4 having built-in the motor M, a compression mechanism housing 6 connected to one side of the motor housing 4 in its axial direction and incorporating the compression mechanism therein, a compression mechanism cover 7 which closes an opening on one side of the compression mechanism housing 6, an inverter accommodating part 8 configured on the other side of the motor housing 4 in its axial direction, and a lid member 11 which closes an opening on the other side of the inverter accommodating part 8 so that it can be opened/closed. Then, the inverter device 3 is accommodated in the inverter accommodating part 8.

Figure 2:
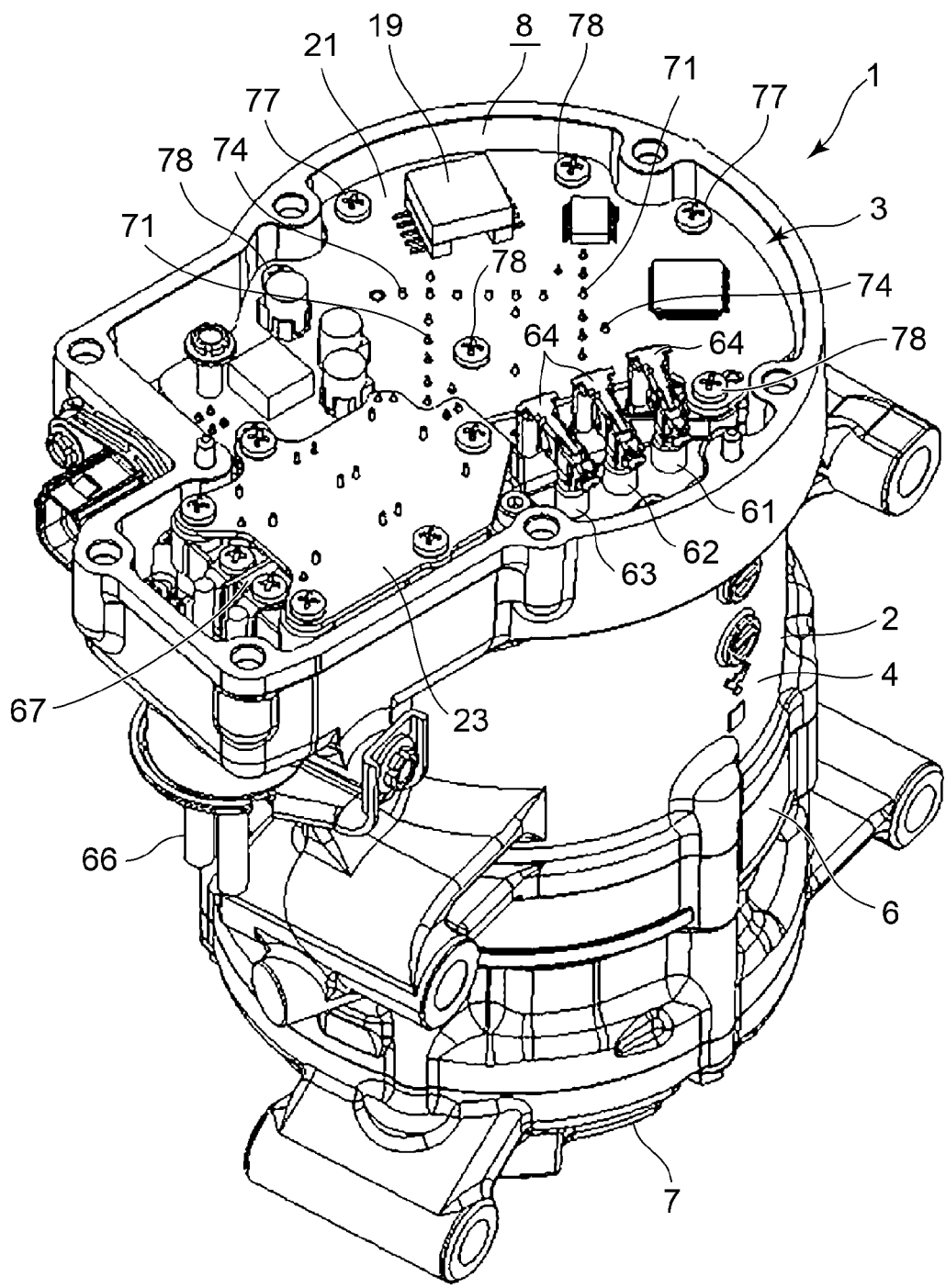
FIG. 2 is a perspective view of the inverter-integrated electric compressor of FIG. 1 with its lid member removed.

Incidentally, although FIGS. 1 and 2 illustrate the inverter-integrated electric compressor 1 according to the embodiment in a state in which the inverter accommodating part 8 is set on and the compression mechanism cover 7 is set down, it is arranged laterally so that the compression mechanism cover 7 is on one side and the inverter accommodating part 8 is on the other side.

The motor M in the embodiment is comprised of an IPMSM (Interior Permanent Magnet Synchronous Motor), and the compression mechanism is, for example, a scroll type compression mechanism. The compression mechanism is driven by the motor M to compress a refrigerant and discharge it into the refrigerant circuit of the vehicle air conditioner. Then, a low-temperature gas refrigerant sucked from an evaporator (also referred to as a heat absorber), which also constitutes a part of the refrigerant circuit, flows through the motor housing 4. Therefore, the inside of the motor housing 4 is cooled. Then, the inverter accommodating part 8 is partitioned from the inside of the motor housing 4 in which the motor M is accommodated, by a partition wall formed in the motor housing 4. This partition wall is also cooled by the low-temperature gas refrigerant.

(1) Inverter Device 3

The inverter device 3 includes six switching elements 13 to 18 comprised of IGBTs (may be MOSFETs) constituting upper and lower arms of each phase of a three-phase inverter circuit 9 (FIG. 3), a control board 21 having a control circuit 19 mounted on print wiring, a bus bar assembly 22 as a wiring member for wiring among a battery 24, the control board 21, the switching elements 13 to 18, and the motor M to be described later (FIG. 3), and a filter board 23. The inverter device 3 converts DC power supplied from the vehicle battery 24 (FIG. 4) as a DC power supply into three-phase AC power and supplies the same to a stator coil (not illustrated) of the motor M.

(2) Electric Circuit of Inverter Device 3

First, the electric circuit of the inverter device 3 will be described with reference to FIG. 4. Reference numeral 26 is a positive electrode-side path connected to a positive electrode side (+) of the battery 24 via an LISN (pseudo power supply circuit network), and reference numeral 27 is a negative electrode-side path connected to a negative electrode side (−) of the battery 24 via an LISN. An EMI filter 28 and a smoothing capacitor 29 are connected to the positive electrode-side path 26 and the negative electrode-side path 27.

The EMI filter 28 is comprised of an X capacitor 31 connected between the positive electrode-side path 26 and the negative electrode-side path 27, a differential mode coil 32 connected to the positive electrode-side path 26 at a post-stage of the X capacitor 31, a common mode coil 33 connected to a post-stage of the differential mode coil 32, and a Y capacitor 36 and a Y capacitor 34 connected between the positive electrode-side path 26 and the negative electrode-side path 27 and the housing 2 respectively at a post-stage of the common mode coil 33.

Then, the EMI filter 28 and the smoothing capacitor 29 are arranged on the filter board 23. The X capacitor 31 is a capacitor for reducing differential mode noise, and the Y capacitors 34 and 36 are capacitors for reducing common mode noise.

Incidentally, the housing 2 is connected to a vehicle body 37 (GND). Then, the housing 2 serves as a reference potential conductor of the inverter device 3.

(2-1) Normal Mode Coil 40, Three-Phase Common Mode Coil 41, and Ferrite Core 42

Further, the inverter circuit 9 is connected to the positive electrode-side path 26 and the negative electrode-side path 27 at a post-stage of the smoothing capacitor 29. A normal mode coil 40, a three-phase common mode coil 41, and a ferrite core 42 each of which serves as a noise reducing element are sequentially connected between intermediate paths 51U to 51W to be described later in the inverter circuit 9 and the motor M. The normal mode coil 40 and the three-phase common mode coil 41 mainly increase a low frequency impedance, and the ferrite core 42 increases a high frequency impedance. The ferrite core 42 is arranged around output paths 56U to 56W to be described later, but in the present invention, such an arrangement is also referred to as a connection. Further, it is assumed that the normal mode coil 40 is connected to all of the output paths 56U to 56W, respectively in the embodiment.

(2-2) Reflux Capacitors 43 and 44

Further, the reflux capacitors 43 and 44 as noise reducing elements comprised of capacitors for refluxing a common mode current are connected between the positive electrode-side path 26 and the negative electrode-side path 27 between the inverter circuit 9 and the smoothing capacitor 29, and the housing 2. In this case, the reflux capacitor 43 is connected between the positive electrode-side path 26 and the housing 2 (reference potential conductor), and the reflux capacitor 44 is connected between the negative electrode-side path 27 and the housing 2.

Then, these reflux capacitors 43 and 44 and the above-described normal mode coil 40, three-phase common mode coil 41, and ferrite core 42 are arranged in the bus bar assembly 22 in the embodiment. Incidentally, the capacitance designated at reference numeral 46 in FIG. 4 indicates a parasitic capacitance between the inverter circuit 9 and the housing 2, and the capacitance designated at reference numeral 47 indicates a parasitic capacitance between the motor M and the housing 2.

(2-3) Inverter Circuit 9

Figure 5:
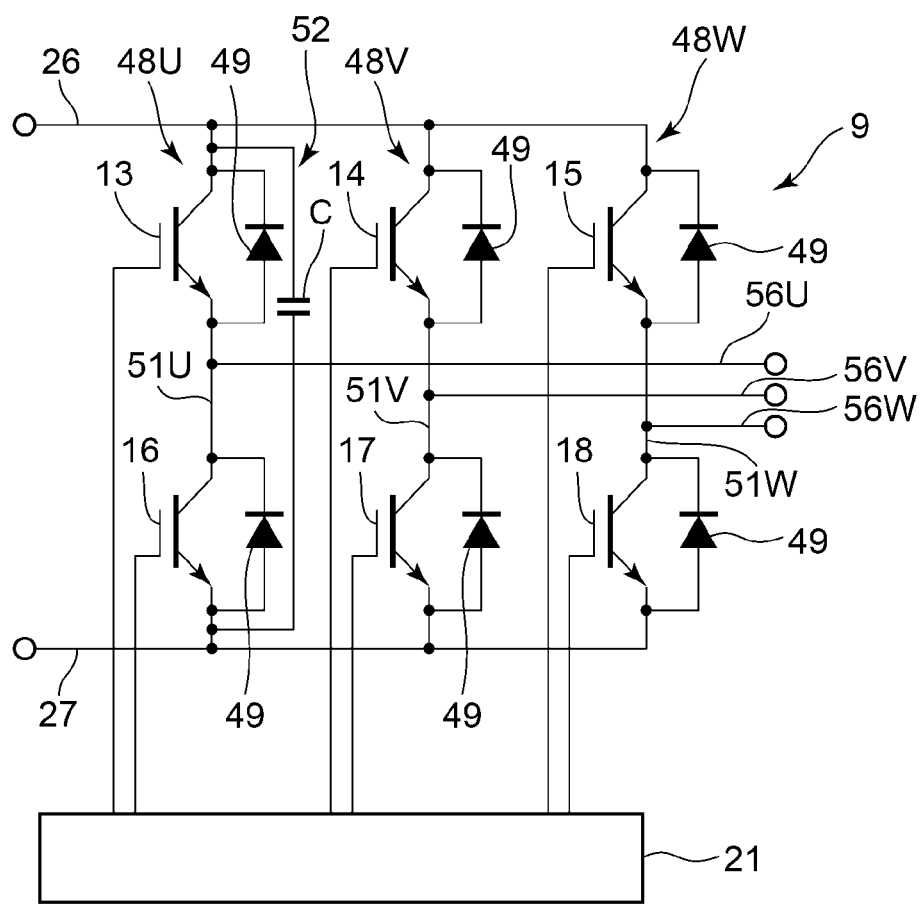
FIG. 5 is an electric circuit diagram of an inverter circuit and a control board in the inverter device of FIG. 4.

Next, FIG. 5 illustrates the electric circuit of the inverter circuit 9 and the control board 21. The inverter circuit 9 has a U-phase inverter 48U, a V-phase inverter 48V, and a W-phase inverter 48W. The phase inverters 48U to 48W have the above-mentioned upper arm side switching elements (each referred to as an upper arm switching element) 13 to 15, and lower arm side switching elements (each referred to as a lower arm switching element) 16 to 18 respectively individually. Further, flywheel diodes 49 are connected in antiparallel to each of the switching elements 13 to 18.

Then, high potential-side terminals of the upper arm switching elements 13 to 15 of the inverter circuit 9 are connected to the positive electrode-side path 26, and low potential-side terminals of the lower arm switching elements 16 to 18 are connected to the negative electrode-side path 27. The low potential-side terminal of the upper arm switching element 13 of the U-phase inverter 48U and the high potential-side terminal of the lower arm switching element 16 are connected by the intermediate path 51U. This intermediate path 51U is connected to the stator coil of the U phase of the motor M by the output path 56U.

Further, the low potential-side terminal of the upper arm switching element 14 of the V phase inverter 48V and the high potential-side terminal of the lower arm switching element 17 are connected by the intermediate path 51V. This intermediate path 51V is connected to the stator coil of the V phase of the motor M by the output path 56V. Further, the low potential-side terminal of the upper arm switching element 15 of the W phase inverter 48W and the high potential-side terminal of the lower arm switching element 18 are connected by the intermediate path 51W. This intermediate path 51W is connected to the stator coil of the W phase of the motor M by the output path 56W. Then, the above-mentioned normal mode coil 40, three-phase common mode coil 41, and ferrite core 42 are provided in each of the output paths 56U to 56W located between the intermediate paths 51U to 51W and the motor M. Incidentally, although the ferrite core 42 is arranged collectively for all phases in the output paths 56U to 56W, it may be arranged around the output paths 56U to 56W of each phase separately respectively.

(2-4) Control Board 21

On the other hand, the control circuit 19 of the control board 21 is comprised of a microcomputer having a processor. The control circuit 19 inputs a rotation speed command value from an ECU of a vehicle, and inputs a phase current from the motor M to control ON/OFF states of the upper and lower arm switching elements 13 to 18 of the inverter circuit 9, based on these. Specifically, the control circuit controls a gate voltage (drive signal) applied to a gate terminal of each of the upper and lower arm switching elements 13 to 18, assumes voltages (phase voltages) of the intermediate paths 51U to 51W respectively connecting the upper and lower arm switching elements 13 to 18 of each phase to be a three-phase AC output, and applies the same to the stator coil of each phase of the motor M via the output paths 56U to 56W to drive the motor M.

(2-5) Snubber Circuit 52

Here, in the embodiment, the snubber circuit 52 as an element for noise reduction is connected across the positive electrode-side path 26 and the negative electrode-side path 27. Specifically, as illustrated in FIG. 5, one end of the snubber circuit 52 is connected to the positive electrode-side path 26 together with the high potential-side terminal of the upper arm switching element 13 of the U-phase inverter 48U, and the other end thereof is connected to the negative electrode-side path 27 together with the low potential-side terminal of the lower arm switching element 16. Incidentally, the snubber circuit 52 in the embodiment is a C snubber circuit which is one of package snubber circuits comprised of a capacitor C. The capacitor C is connected across the positive electrode-side path 26 and the negative electrode-side path 27.

The snubber circuit 52 consumes energy due to a surge voltage generated at the turn-off of the upper and lower arm switching elements 13 to 18. By consuming the energy due to the surge voltage in the snubber circuit 52, it is possible to reduce a high frequency surge voltage generated between the drain and source (between the collector and emitter) of each of the upper and lower arm switching elements 13 to 18, and it is possible to suppress a common mode current generated between the motor M and the housing 2 and reduce noise (mainly radio noise).

Then, the capacitor C of the snubber circuit 52 is also arranged in the bus bar assembly 22 in the embodiment. Arranging the capacitor C of the snubber circuit 52, the normal mode coil 40, the three-phase common mode coil 41, the ferrite core 42, the reflux capacitors 43 and 44 in the bus bar assembly 22 makes it possible to eliminate the need to mount them on the control board 21 and reduce the size of the control board 21. Further, by arranging the snubber circuit 52 in the bus bar assembly 22, the snubber circuit 52 can be arranged closer to the switching elements 13 to 18, and a noise attenuation effect can also be enhanced.

Figure 3:
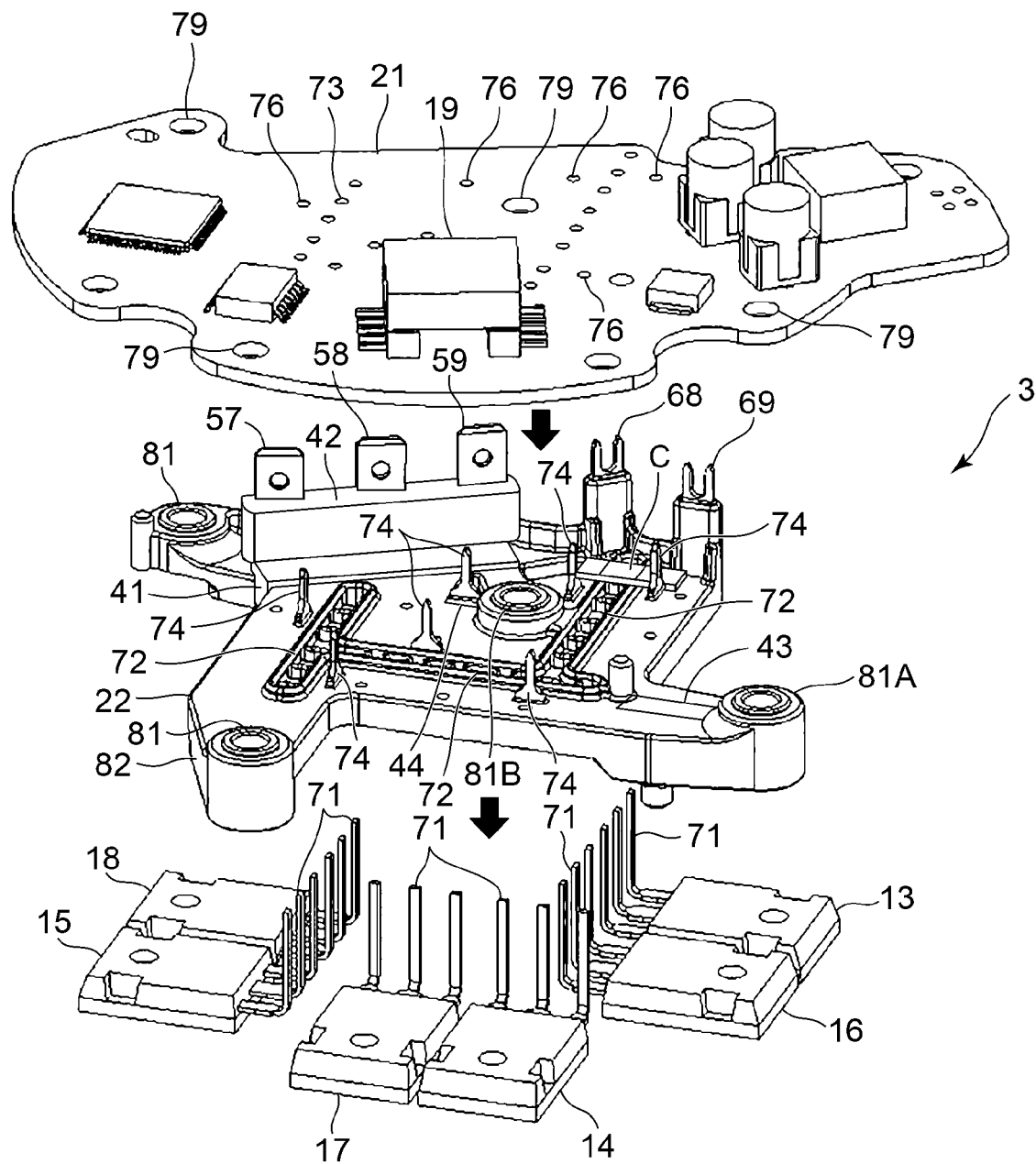
FIG. 3 is an exploded perspective view of parts other than a filter board of an inverter device illustrated in FIG. 2.

In FIG. 3, reference numerals 57 to 59 are bus bars each made of a conductive metal provided in the bus bar assembly 22. These bus bars 57 to 59 are connected to lead-out terminals 61 to 63 drawn out from a partition wall of the motor housing 4 via three terminal plates 64, respectively. Then, the bus bars 57 to 59, the terminal plate 64, and the lead-out terminals 61 to 63 constitute parts of the output paths 56U to 56W described above.

Further, the positive electrode-side path 26 and the negative electrode-side path 27 described above are connected to a power supply harness from the above-described battery 24 via an HV connector 66 attached to the motor housing 4. In this case, a terminal plate 67 of the filter board 23 is conductively connected to the power supply harness via the HV connector 66, and an unillustrated terminal plate on the control board 21 side is connected to each of bus bars 68 and 69 of the bus bar assembly 22. That is, the bus bar 69 constitutes a part of the positive electrode-side path 26, and the bus bar 68 constitutes a part of the negative electrode-side path 27.

In addition, the upper and lower arm switching elements 13 to 18 of the above-mentioned inverter circuit 9 are in close contact with the partition wall of the motor housing 4 and are arranged in a heat conduction relationship with the partition wall. Since the partition wall is cooled by the low-temperature gas refrigerant as described above, the upper and lower arm switching elements 13 to 18 accompanied by heat generation are cooled from the partition wall.

(3) Assembling of Inverter Device 3

Next, a procedure for assembling the inverter device 3 to the motor housing 4 will be described. First, the upper and lower arm switching elements 13 to 18 are arranged on the partition wall of the motor housing 4 described above in such a form as illustrated in FIG. 3. Next, the bus bar assembly 22 is placed on the upper and lower arm switching elements 13 to 18 in such a form as indicated by arrows in FIG. 3. At this time, each terminal 71 of each of the upper and lower arm switching elements 13 to 18 is made to enter a through hole 72 of the bus bar assembly 22, and its tip is protruded from the bus bar assembly 22.

Next, the control board 21 is placed on the bus bar assembly 22 as indicated by an arrow in FIG. 3. At this time, the terminals 71 of the upper and lower arm switching elements 13 to 18 are inserted into connection holes 73 of the control board 21. Further, each terminal 74 of the bus bar assembly 22 is inserted into a connection hole 76 of the control board 21. In this way, the upper and lower arm switching elements 13 to 18 are positioned closest to the partition wall side of the housing 4, the bus bar assembly 22 is arranged thereon. Further, the control board 21 is arranged in a stacked form on the bus bar assembly 22. Incidentally, the bus bars 57 to 59, 68, and 69 of the bus bar assembly 22 are located outside the control board 21.

After arranging the control board 21, the bus bar assembly 22, and the upper and lower arm switching elements 13 to 18 in a form of being stacked within the inverter accommodating part 8 in this way, the control board 21 and the bus bar assembly 22 are fastened to the motor housing 4 with screws 77 and 78. At that time, the screws 78 penetrate screw holes 79 of the control board 21 and screw holes 81, 81A, and 81B of the bus bar assembly 22, and the control board 21 and the bus bar assembly 22 are fastened together to the motor housing 4. Further, consequently, each screw 78 and the screw holes 81, 81A, and 81B are conducted to the motor housing 4 (housing 2) and reach the same potential.

After that, the terminals 71 and 74 are soldered to the control board 21 and circuits of the bus bar assembly 22 and electrically connected to each other. Further, the lead-out terminals 61 to 63 and the bus bars 57 to 59 are connected by the terminal plates 64, the filter board 23 is connected to the bus bars 68 and 69, and the filter board 23 is connected to the HV connector 66 by the terminal board 67.

(4) Constitution of Bus Bar Assembly 22

Next, the structure of the bus bar assembly 22 in the embodiment will be described in detail with reference to FIGS. 6 to 11. As illustrated in FIG. 3, in the present embodiment, the above-mentioned normal mode coil 40, three-phase common mode coil 41, ferrite core 42, reflux capacitors 43 and 44, and capacitor C of the snubber circuit 52 (all are elements for noise reduction) are arranged in the bus bar assembly 22. However, in FIGS. 6 to 11 used in the following description, the arrangement of each element is illustrated separately in order to make it easy to understand the positional relationship between each of the bus bars 57 to 59, 68, and 69 and each element.

Figure 6:
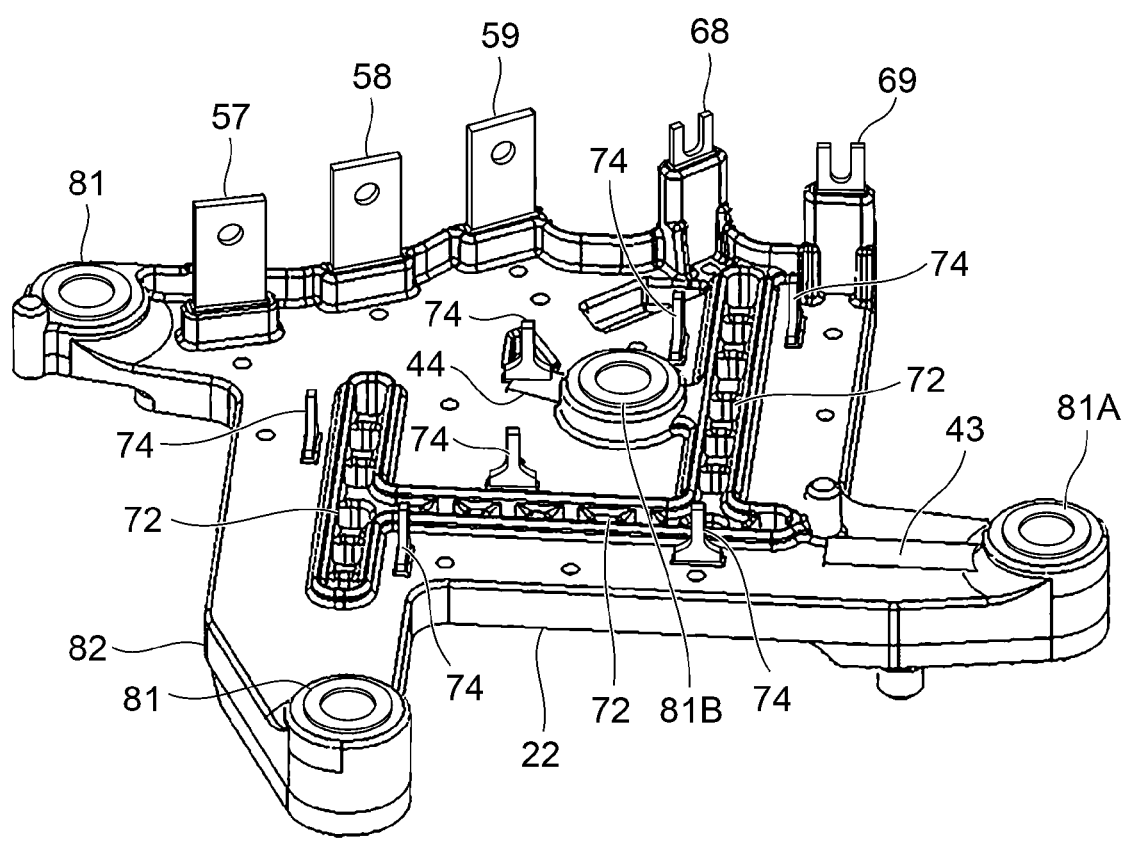
FIG. 6 is a perspective view of a bus bar assembly in FIG. 3.
Figure 7:
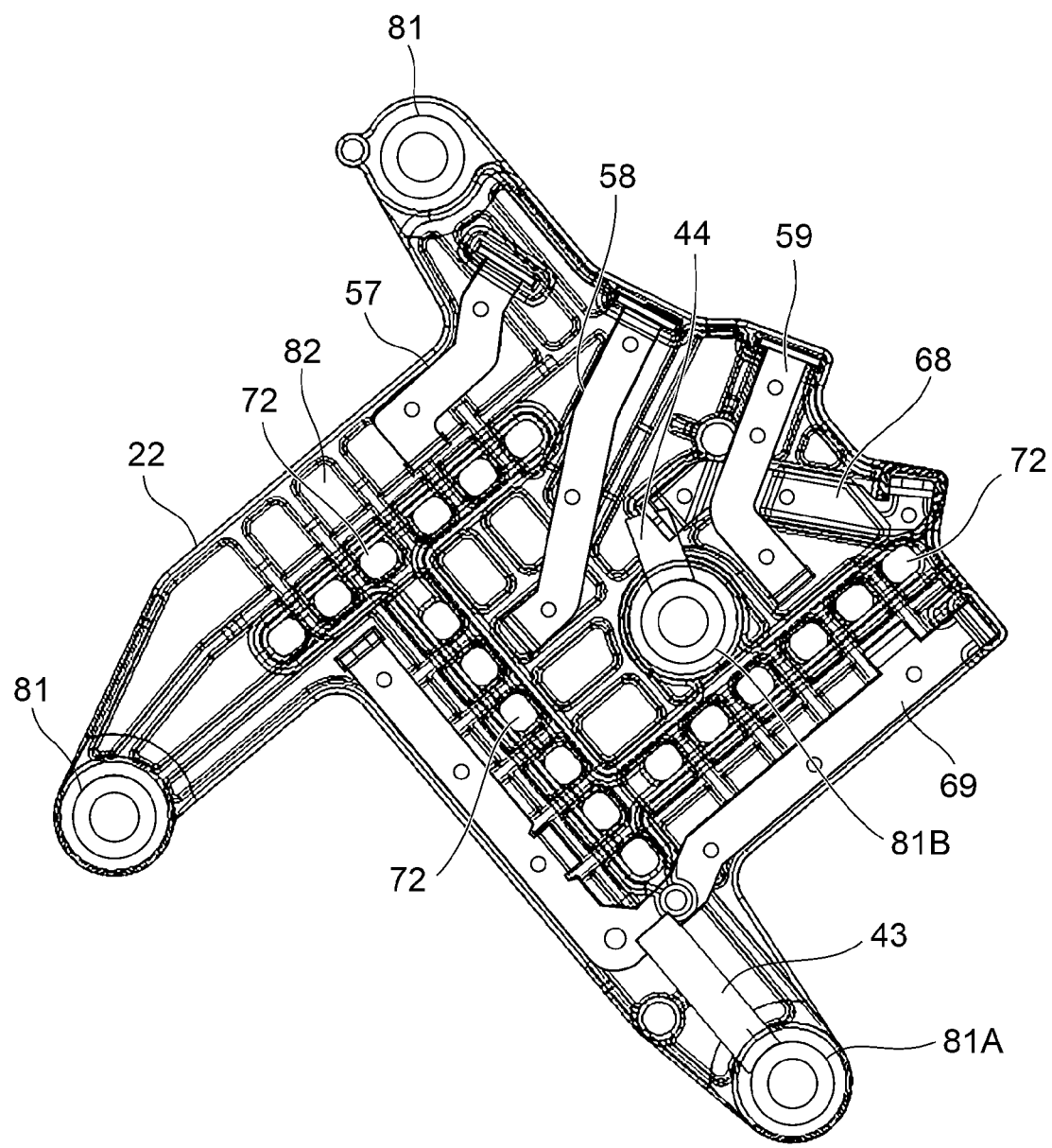
FIG. 7 is a see-through plan view of the bus bar assembly of FIG. 6.
Figure 8:
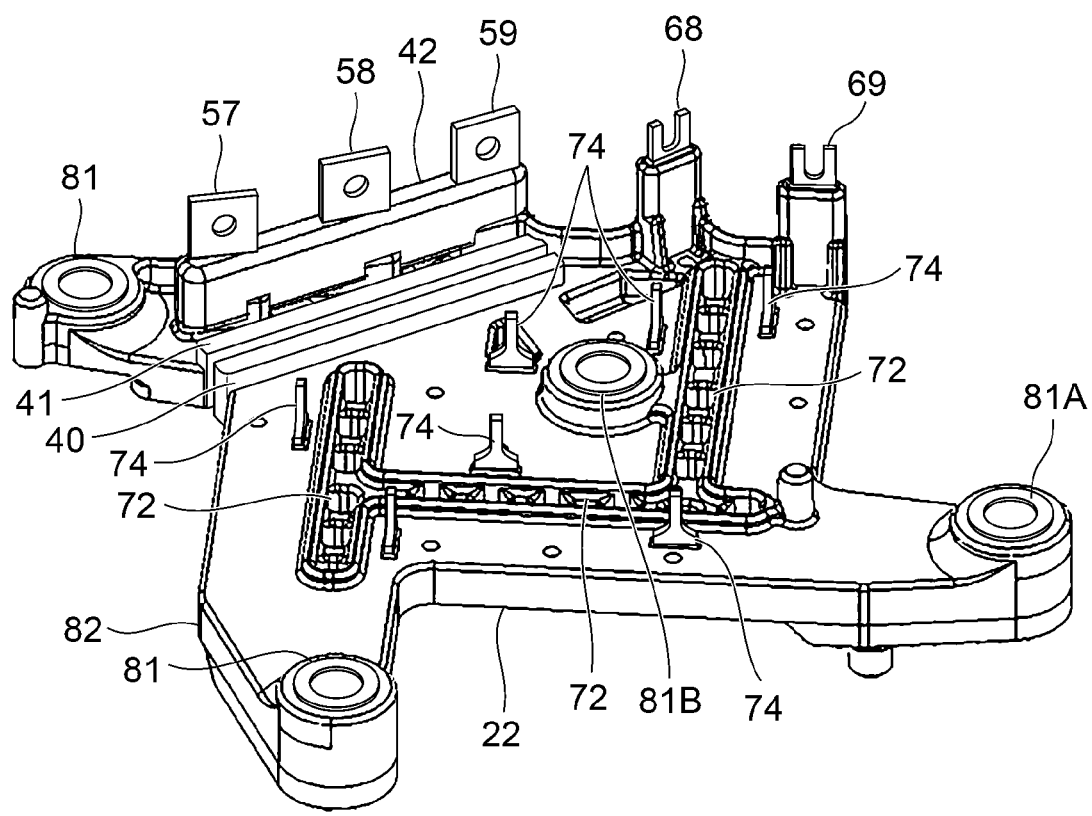
FIG. 8 is a perspective view of another bus bar assembly.
Figure 9:
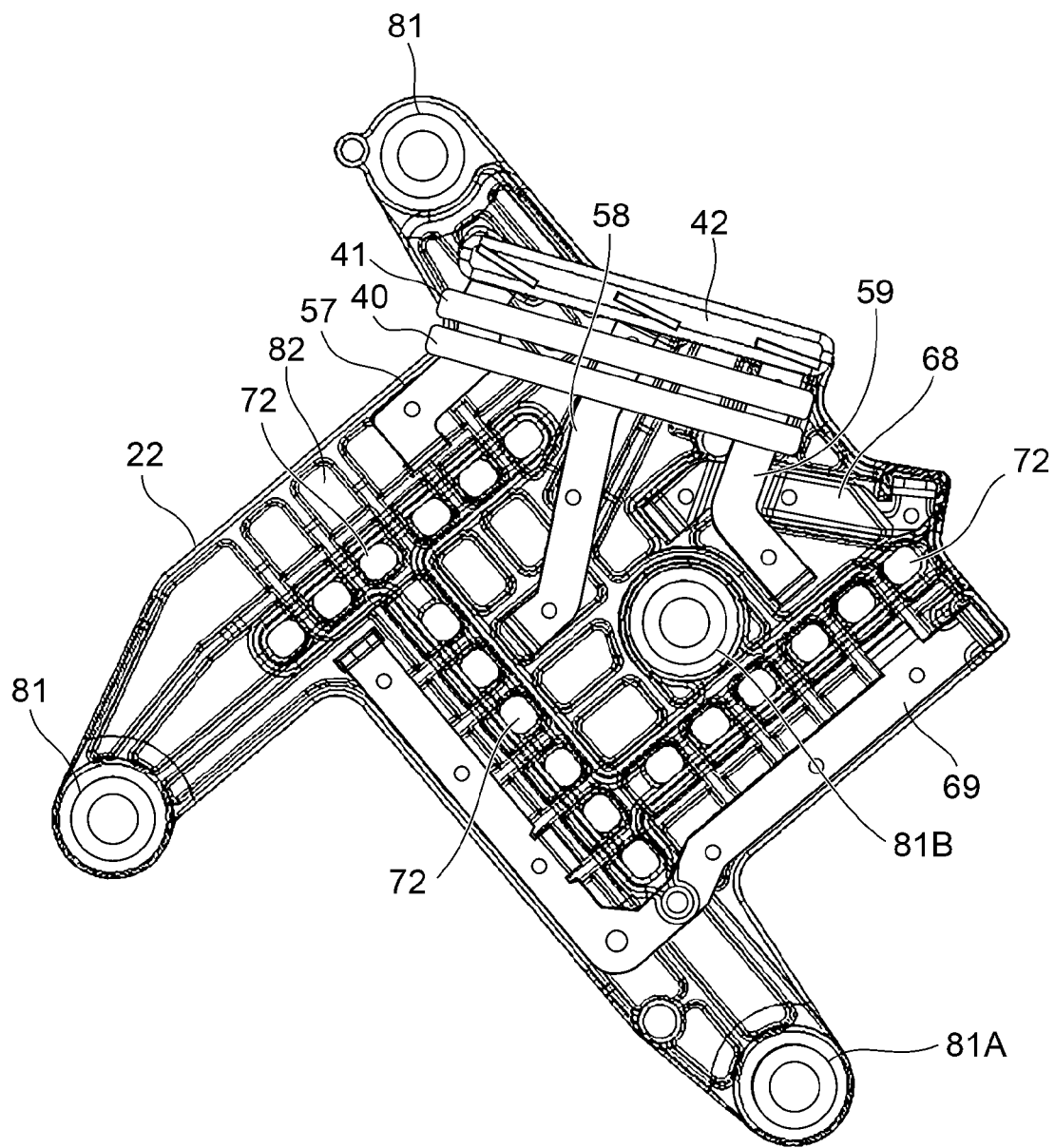
FIG. 9 is a see-through plan view of the bus bar assembly of FIG. 8.
Figure 10:
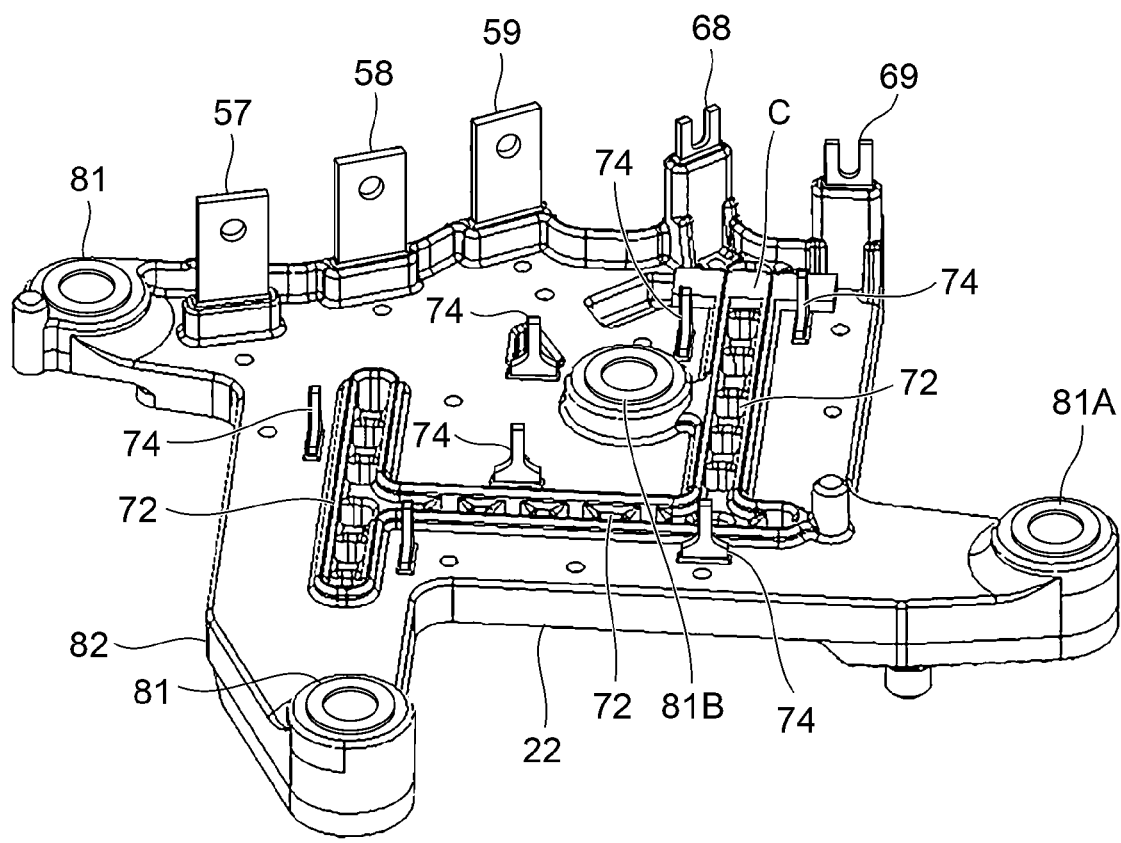
FIG. 10 is a perspective view of a further bus bar assembly.
Figure 11:
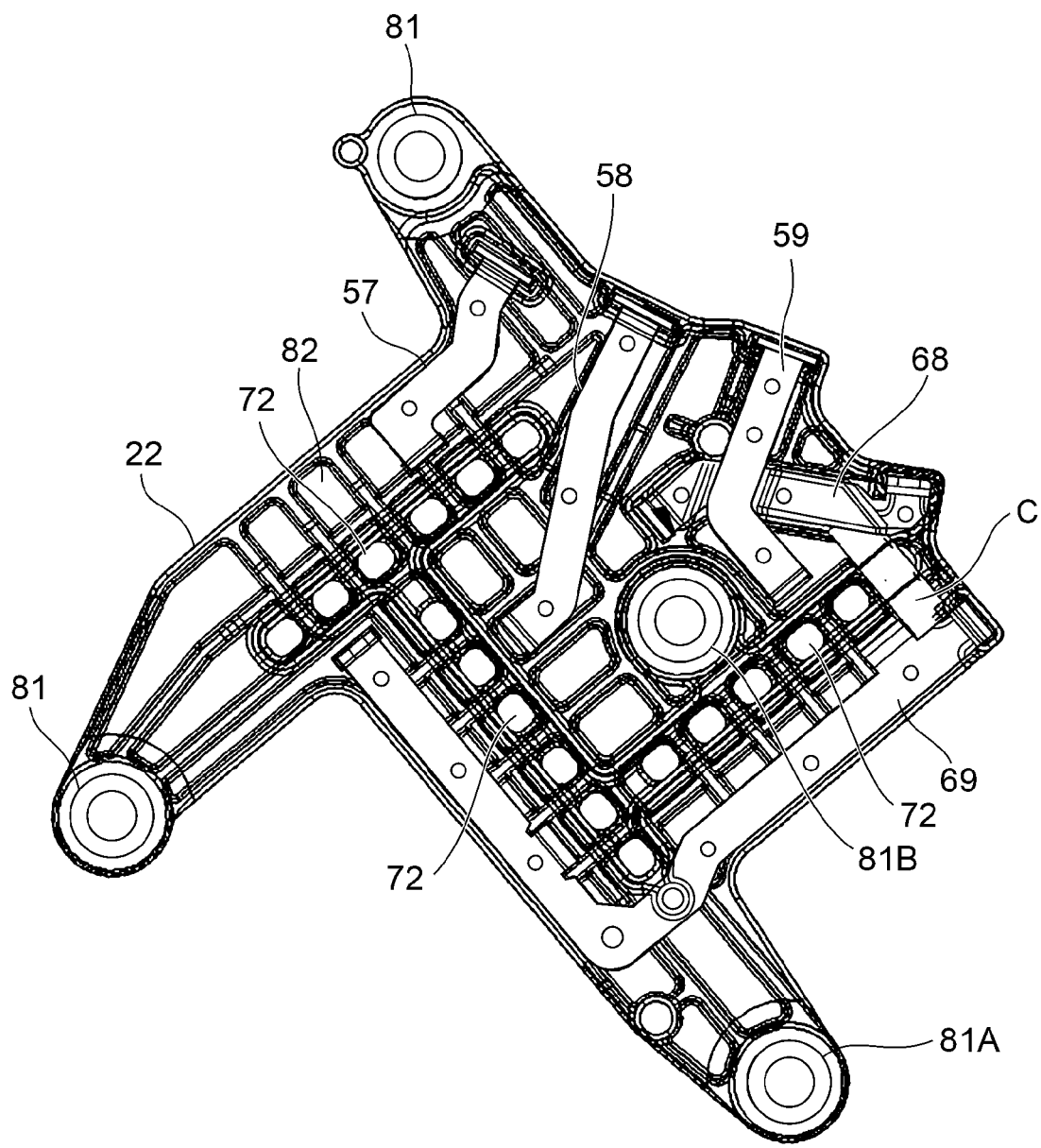
FIG. 11 is a see-through plan view of the bus bar assembly of FIG. 10.

That is, FIGS. 6 and 7 illustrate the arrangement of the reflux capacitors 43 and 44, FIGS. 8 and 9 illustrate the arrangement of the normal mode coil 40, the three-phase common mode coil 41, and the ferrite core 42, and FIGS. 10 and 11 illustrate the arrangement of the capacitor C of the snubber circuit 52. However, in the present embodiment, it is assumed that all of them are actually provided in the bus bar assembly 22 as illustrated in FIG. 3

(4-1) Arrangement of Reflux Capacitors 43 and 44

First, FIGS. 6 and 7 will be described. FIG. 6 depicts a perspective view of the bus bar assembly 22, which illustrates the arrangement of the reflux capacitors 43 and 44, and FIG. 7 illustrates a see-through plan view of the bus bar assembly 22 of FIG. 6, respectively. The bus bar assembly 22 has a configuration in which the above-mentioned bus bars 57 to 59, 68, and 69 are molded with an insulating hard resin 82. By resin-molding the bus bars 57 to 59, 68, and 69 in this way to form the bus bar assembly 22, it is also possible to secure earthquake resistance while ensuring insulation.

Each of the bus bars 57 to 59, 68, and 69 is comprised of a conductive metal plate, and most of them are embedded in the hard resin 82. One ends of them protrude outward from the hard resin 82 in a vertically raised state at the edge of the bus bar assembly 22, and the above-described terminals 74 protrude outward from the hard resin 82 in a state of being vertically raised from the other end and a point in the middle thereof. Then, as described above, the bus bars 57 to 59 constitute parts of the output paths 56U to 56W. Further, the bus bar 69 constitutes a part of the positive electrode-side path 26 as described above, and the bus bar 68 constitutes a part of the negative electrode-side path 27.

Further, in the embodiment, the above-mentioned reflux capacitor 43 is provided between the screw hole 81A located at the end of the bus bar assembly 22 and the bus bar 69 and is conducted to them. Along with it, the reflux capacitor 44 is provided between the screw hole 81B located at the center of the bus bar assembly 22 and the bus bar 68 and is conducted to them. The screw holes 81A and 81B are conducted to the housing 2 as described above, thereby connecting the reflux capacitor 43 between the positive electrode-side path 26 and the housing 2 (reference potential conductor) as illustrated in FIG. 4, and connecting the reflux capacitor 44 between the negative electrode-side path 27 and the housing 2. In this case, the reflux capacitors 43 and 44 may be molded and embedded in the hard resin 82 of the bus bar assembly 22, or may be mounted on the surface of the hard resin 82.

(4-2) Arrangement of Normal Mode Coil 40, Three-Phase Common Mode Coil 41, and Ferrite Core 42

Next, FIGS. 8 and 9 will be described. FIG. 8 illustrates a perspective view of the bus bar assembly 22, which depicts the arrangement of the normal mode coil 40, the three-phase common mode coil 41, and the ferrite core 42, and FIG. 9 illustrates a see-through plan view of the bus bar assembly 22 of FIG. 8, respectively. The configurations of the bus bars 57 to 59, 68, and 69 of the bus bar assembly 22 and the structure in which they are molded with the hard resin 82 are as described above.

Then, in the embodiment, the above-mentioned normal mode coil 40 is connected to the upright end portion side of the bus bars 57 to 59. The ferrite core 42 is provided around the upright end portions of the bus bars 57 to 59. The three-phase common mode coil 41 is provided between the normal mode coil 40 and the ferrite core 42. As described above, the bus bars 57 to 59 constitute parts of the output paths 56U to 56W, and the output paths 56U to 56W are located between the intermediate paths 51U to 51W and the motor M as described above. Consequently, the normal mode coil 40, the three-phase common mode coil 41, and the ferrite core 42 are connected between the intermediate paths 51U to 51W and the motor M. In this case, the normal mode coil 40, the three-phase common mode coil 41, and the ferrite core 42 may be molded and embedded in the hard resin 82 of the bus bar assembly 22, or may be mounted on the surface of the hard resin 82.

(4-3) Arrangement of Capacitor C in Snubber Circuit 52

Next, FIGS. 10 and 11 will be described. FIG. 10 depicts a perspective view of the bus bar assembly 22, which illustrates the arrangement of the capacitor C of the snubber circuit 52, and FIG. 11 illustrates a see-through plan view of the bus bar assembly 22 of FIG. 10, respectively. Similarly, the configurations of the bus bars 57 to 59, 68, and 69 of the bus bar assembly 22 and the structure in which they are molded with the hard resin 82 are as described above.

Then, in the embodiment, the capacitor C of the snubber circuit 52 described above is connected across the upright one end portion side of the bus bars 68 and 69. As described above, the bus bar 69 constitutes a part of the positive electrode-side path 26, and the bus bar 68 constitutes a part of the negative electrode-side path 27. Consequently, the capacitor C is connected across the positive electrode-side path 26 and the negative electrode-side path 27. In this case, the capacitor C may be molded and embedded in the hard resin 82 of the bus bar assembly 22, or may be mounted on the surface of the hard resin 82.

Incidentally, in the embodiment (FIGS. 3 and 4), all of the normal mode coil 40, the three-phase common mode coil 41, the ferrite core 42, the reflux capacitors 43 and 44, and the capacitor C of the snubber circuit 52 as elements for noise reduction are arranged in the bus bar assembly 22, but are not limited to this. Only the reflux capacitors 43 and 44 may be arranged in the bus bar assembly 22 as illustrated in FIGS. 6 and 7. Only the normal mode coil 40, the three-phase common mode coil 41, and the ferrite core 42 may be arranged in the bus bar assembly 22 as illustrated in FIGS. 8 and 9. Also in the cases of FIGS. 8 and 9, only the normal mode coil 40 may be arranged in the bus bar assembly 22, only the three-phase common mode coil 41 may be arranged in the bus bar assembly 22, and only the ferrite core 42 may be arranged in the bus bar assembly 22.

Further, only the capacitor C of the snubber circuit 52 may be arranged in the bus bar assembly 22 as illustrated in FIGS. 10 and 11, and two of them (reflux capacitors 43 and 44, normal mode coil 40, three-phase common mode coil 41, ferrite core 42, and capacitor C of snubber circuit 52) may be arranged in the bus bar assembly 22 in combination.

(5) Noise Reduction Effect

Figure 12:
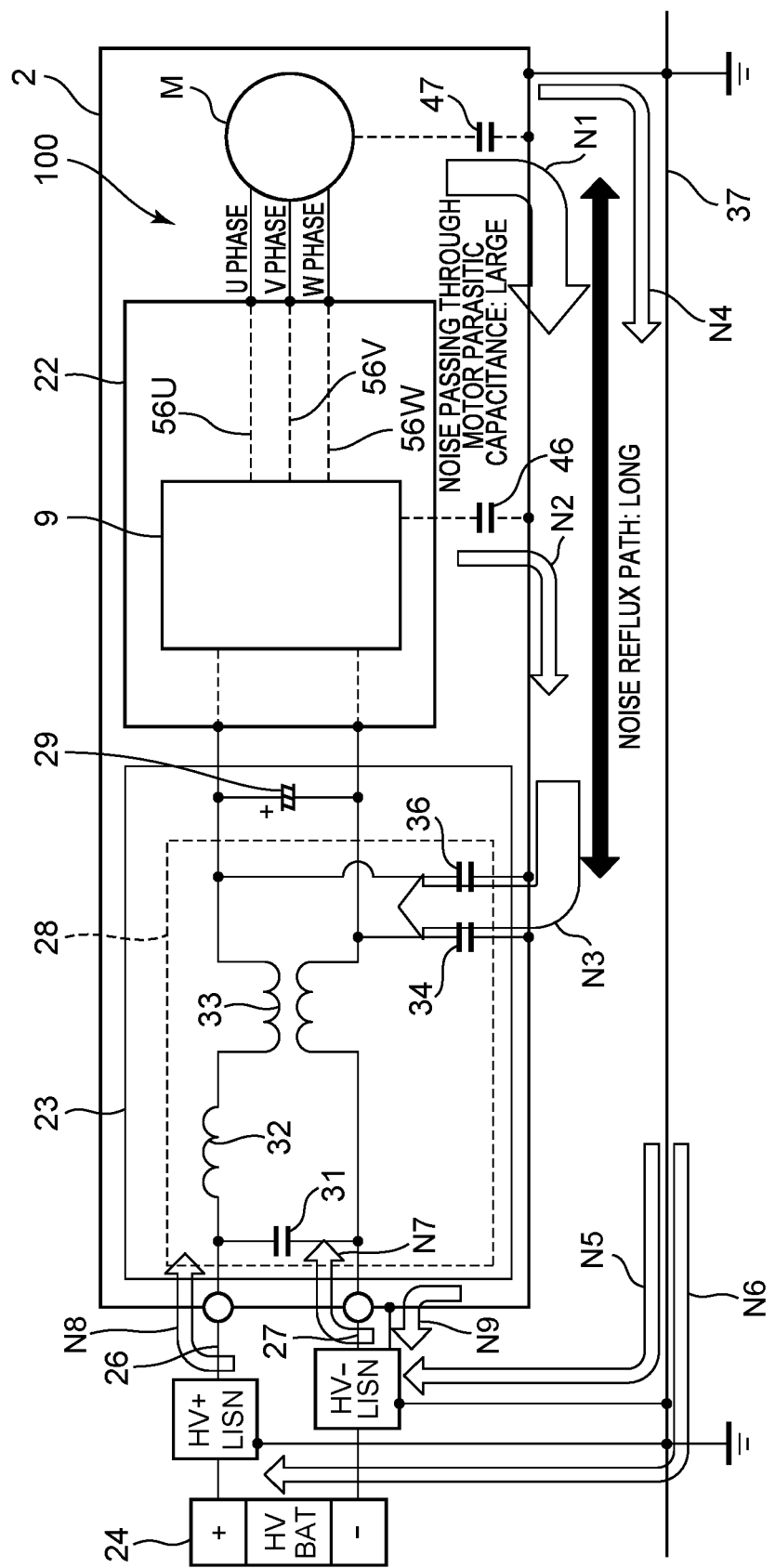
FIG. 12 is a view describing a noise path of a conventional inverter device.

Next, the noise reduction effect according to the present invention will be described with reference to FIGS. 12 and 13. FIG. 12 illustrates an electric circuit diagram of an inverter device 100 which is not provided with the above-mentioned normal mode coil 40, three-phase common mode coil 41, ferrite core 42, reflux capacitors 43 and 44, and snubber circuit 52. Incidentally, in this figure, those represented by the same reference numerals as those in FIG. 4 are assumed to have the same or similar functions.

In this figure, an arrow indicated by N1 indicates a common mode current (noise) flowing out from the motor M to the housing 2 via the parasitic capacitor 47, an arrow indicated by N2 indicates a common mode current (noise) flowing out from the inverter circuit 9 to the housing 2 via the parasitic capacitor 46, an arrow indicated by N3 indicates a common mode current (noise) which flows back from the housing 2 to the upper and lower arm switching elements 13 to 18 of the inverter circuit 9 via the Y capacitors 34 and 36, and an arrow indicated by N9 indicates a common mode current (noise) flowing into the LISNs 26 and 27 on the positive electrode side (+) and the negative electrode side (−) through a shielded wire of the HV connector 66, respectively. An arrow indicated by N4 indicates a common mode current (noise) flowing out from the housing 2 to the vehicle body 37, and arrows indicated by N5 to N8 indicate a common mode current (noise) flowing from the vehicle body 37 to the EMI filter 28 through the LISN 27 and LISN 26. Incidentally, although the arrows in the figure are illustrated in only one direction, the actual flow of the common mode current is not simple, and the current flows out and in in both directions at each location.

In the case of the inverter device 100 of FIG. 12, the common mode current (N1) flowing out from the motor M via the parasitic capacitance 47 becomes large. Further, the common mode current and the common mode current (N2) flowing out from the inverter circuit 9 to the housing 2 are refluxed to the upper and lower arm switching elements 13 to 18 of the inverter circuit 9 which is a noise source via the Y capacitors 34 and 36 (N3). However, since the Y capacitors 34 and 36 are separated from the motor M and the inverter circuit 9, a reflux path becomes long, and the filter effect (effect of refluxing the common mode current) of the Y capacitors 34 and 36 cannot be sufficiently obtained.

Figure 4:
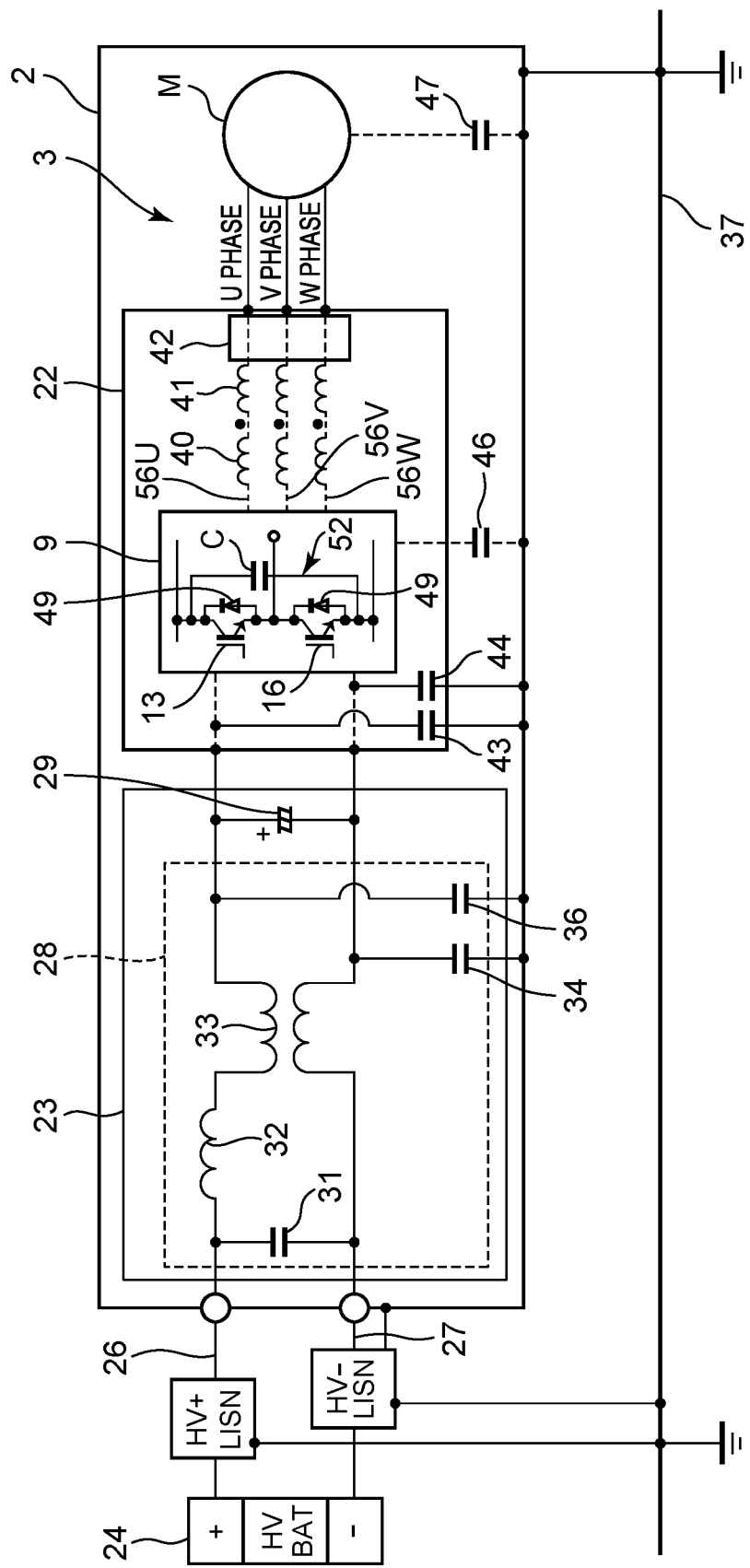
FIG. 4 is an electric circuit diagram of the inverter device of FIG. 3.
Figure 13:
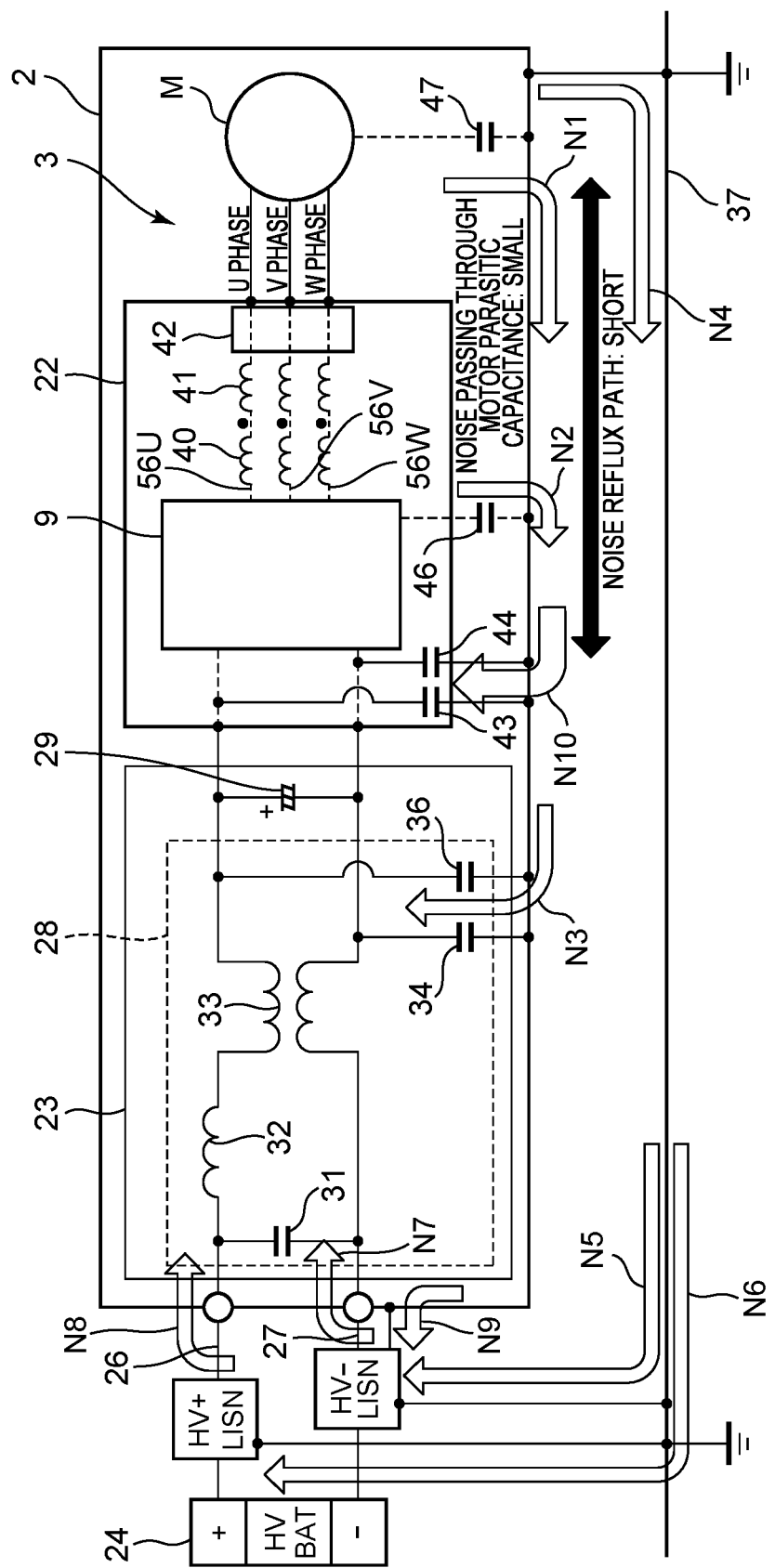
FIG. 13 is an electric circuit diagram for describing a noise path of the inverter device of FIG. 4.

On the other hand, by arranging the reflux capacitors 43 and 44 as illustrated in FIG. 4, most of the common mode current (N1) flowing out from the motor M via the parasitic capacitance 47 and the common mode current (N2) flowing out from the inverter circuit 9 to the housing 2 are refluxed to the upper and lower arm switching elements 13 to 18 of the inverter circuit 9 which is a noise source via the reflux capacitors 43 and 44 as indicated by an arrow N10 in FIG. 13. Since the reflux capacitors 43 and 44 are arranged in the bus bar assembly 22 provided at a position closer to the motor M and the upper and lower arm switching elements 13 to 18 of the inverter circuit 9 than the filter board 23, the reflux path becomes short, and a high filter effect can be obtained in the reflux capacitors 43 and 44. This makes it possible to suppress noise without inserting a large common mode coil into the power input unit as in the past and effectively suppress noise while miniaturizing the inverter-integrated electric compressor 1.

Further, in the embodiment, since the three-phase common mode coil 41 and the ferrite core 42 are arranged in the bus bar assembly 22 between the upper and lower arm switching elements 13 to 18 of the inverter circuit 9 and the motor M, the impedance of a path reaching the housing 2 through each of the intermediate paths 51U to 51W connecting the upper and lower arm switching elements 13 to 18 of the inverter circuit 9, each of the output paths 56U to 56W, and the motor M increases and hence the common mode current (noise. It is indicated by the arrow N1) flowing out via the parasitic capacitance 47 becomes small. Further, in the embodiment, since the normal mode coil 40 is also arranged in the bus bar assembly 22 between the upper and lower arm switching elements 13 to 18 of the inverter circuit 9 and the motor M, it is possible to effectively suppress switching surge. These also eliminate the need to insert a large EMI filter (common mode coil) into the power input unit, thus making it possible to effectively suppress noise while achieving the miniaturization of the inverter-integrated electric compressor 1.

In particular, unlike the common mode coil, since the normal mode coil 40 does not require the coupling of the three-phase lines, it can be arranged separately. There are fewer restrictions on the arrangement of the normal mode coil 40 in the bus bar assembly 22, and it is easier to be miniaturized than in the case of the common mode coil. Incidentally, the normal mode coil 40 may not be inserted in all of the output paths 56U to 56W (three phases) as in the embodiment, but may be inserted in only two phases, for example. This also has the advantage of being easy to use because the noise reduction effect can be obtained.

Further, in the embodiment, since the capacitor C of the snubber circuit 52 for reducing the noise is arranged in the bus bar assembly 22, the noise (mainly radio noise) can be effectively reduced. In this case, the snubber circuit is not mounted on the control board 21, but is arranged in the bus bar assembly 22 to form a three-dimensional arrangement (because the control board 21, the bus bar assembly 22, and the upper and lower arm switching elements 13 to 18 are stacked). Thus, it is possible to reduce the size while ensuring a sufficient creepage distance (6) Configuration Example of Snubber Circuit 52

Figure 14:
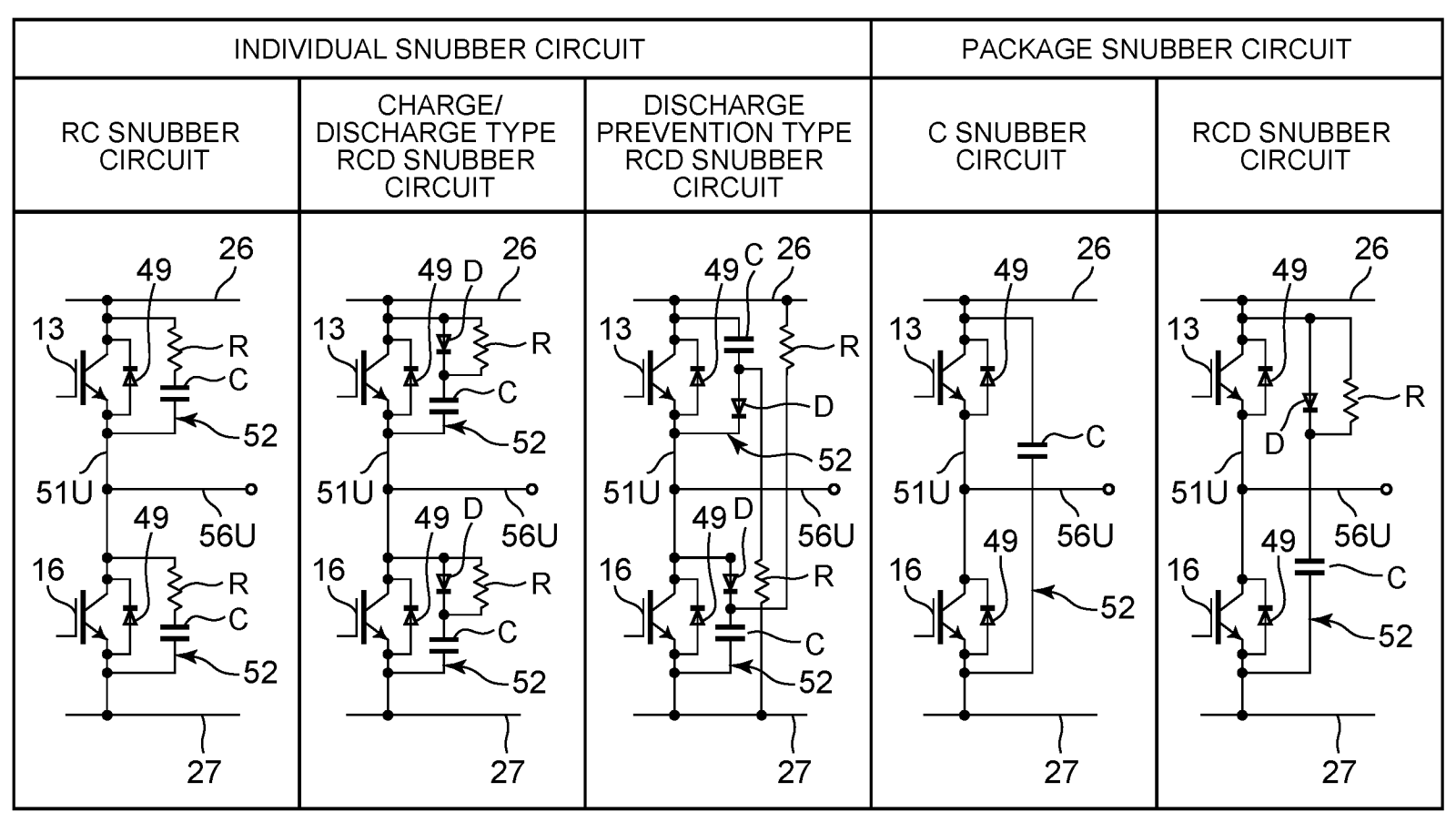

Incidentally, although the snubber circuit 52 illustrated in the embodiment has been described by the C snubber circuit in the package snubber circuit in which only the capacitor C is connected between the positive electrode-side path 26 and the negative electrode-side path 27, various configurations as illustrated in FIG. 14 can be considered as the snubber circuit 52. The right side in this figure illustrates an example of the package snubber circuit, and the second from the right is the C snubber circuit illustrated in the above-described embodiment. The package snubber circuit is connected between the positive electrode-side path 26 and the negative electrode-side path 27, but in addition, an RCD snubber circuit illustrated at the right end in the figure can be considered. This RCD snubber circuit is comprised of a parallel circuit of a diode D and a resistor R, and a capacitor C connected in series to the parallel circuit. The diode D has a capacitor C direction as a forward direction. The parallel circuit side is connected to the positive electrode-side path 26 and the capacitor C side is connected to the negative electrode-side path 27.

Further, the left side in the figure illustrates an example of an individual snubber circuit. The individual snubber circuit is connected individually to the upper and lower arm switching elements 13 to 18. Examples of this individual snubber circuit include an RC snubber circuit (left end in FIG. 14), a charge/discharge type RCD snubber circuit (second from the left in FIG. 14), and a discharge prevention type RCD snubber circuit (third from the left in FIG. 14).

The RC snubber circuit consists of a series circuit of a resistor R and a capacitor C, and is connected across the collectors and emitters of the upper and lower arm switching elements 13 to 18, respectively. In the charge/discharge type RCD snubber circuit, a snubber circuit 52 comprised of a parallel circuit of a diode D and a resistor R, and a capacitor C connected in series to the parallel circuit is connected across the collector and emitter of each of the individual upper and lower arm switching elements 13 to 18. In this case, the diode D has a capacitor C direction as a forward direction. The parallel circuit side is connected to the collector, and the capacitor C side is connected to the emitter.

The discharge prevention type RCD snubber circuit is comprised of a series circuit of a capacitor C and a diode D connected across the collector and emitter of each of the individual upper and lower arm switching elements 13 to 18, a resistor R connected between the capacitor C and the diode D of each of the upper arm switching elements 13 to 15 and across the negative electrode-side path 27, and a resistor R connected between the diode D and the capacitor C of each of the lower arm switching elements 16 to 18 and across the positive electrode-side path 26.

In this case, in the upper arm switching elements 13 to 15, the capacitor C is connected to the collector, the diode D is connected to the emitter, and the diode D has the emitter side as the forward direction. Further, in the lower arm switching elements 16 to 18, the diode D is connected to the collector, the capacitor C is connected to the emitter, and the diode D has the capacitor C side as the forward direction. Any snubber circuit 52 consumes the surge voltage generated at the turn-off of the upper and lower arm switching elements 13 to 18.

Incidentally, in the embodiment, the bus bar assembly 22 in which the bus bars 57 to 59, 68, and 69 are molded with the hard resin 82 is adopted as the wiring member, but in the inventions of claims 1 to 3, the bus bar may be used which is not molded with the resin. Further, the shapes and structures of the inverter device 3 and the housing 2 (motor housing 4) illustrated in the embodiment are not limited thereto, and needless to say, they can be variously changed without departing from the spirit of the present invention.

DESCRIPTION OF REFERENCE NUMERALS

- 1 inverter-integrated electric compressor
- 2 housing
- 3 inverter device
- 4 motor housing
- 8 inverter accommodating part
- 9 inverter circuit
- 13 to 18 upper and lower arm switching element
- 21 control board
- 22 bus bar assembly (wiring member)
- 24 battery (DC power supply)
- 26 positive electrode-side path
- 27 negative electrode-side path
- 40 normal mode coil
- 41 three-phase common mode coil
- 42 ferrite core
- 43, 44 reflux capacitor
- 51U to 51W intermediate path
- 52 snubber circuit
- 57 to 59, 68, 69 bus bar
- 82 hard resin
- C capacitor
- D diode
- M motor
- R resistor

The invention claimed is:

1. An inverter-integrated electric compressor including an inverter device which has a switching element and applies a three-phase AC output to a motor, comprising:
   a control board configured to control switching of the switching element; and
   a wiring member provided to establish wiring of a DC power supply, the control board, the switching element, and the motor,
   wherein elements for noise reduction are arranged in the wiring member, and
   wherein the elements for noise reduction include at least reflux capacitors to reflux an outflowing common mode current to a noise source in a short reflux path.

2. The inverter-integrated electric compressor according to claim 1, wherein the control board, the wiring member, and the switching element are provided in stacked form.

3. The inverter-integrated electric compressor according to claim 1, wherein the elements for noise reduction further include any of a snubber circuit to reduce noise, a normal mode coil connected between the switching element and the motor, a three-phase common mode coil connected between the switching element and the motor, and a ferrite core connected between the switching element and the motor, or a combination of them, or all of them.

4. The inverter-integrated electric compressor according to claim 3, wherein the snubber circuit is an individual snubber circuit, or a package snubber circuit.

5. The inverter-integrated electric compressor according to claim 3, wherein the snubber circuit is constituted by a capacitor, or a capacitor and a resistor, or a capacitor, a resistor, and a diode.

6. The inverter-integrated electric compressor according to claim 1, wherein the wiring member is a bus bar assembly made by molding a bus bar with a resin.

7. The inverter-integrated electric compressor according to claim 2, wherein the elements for noise reduction further include any of a snubber circuit to reduce noise, a normal mode coil connected between the switching element and the motor, a three-phase common mode coil connected between the switching element and the motor, and a ferrite core connected between the switching element and the motor, or a combination of them, or all of them.

8. The inverter-integrated electric compressor according to claim 4, wherein the snubber circuit is constituted by a capacitor, or a capacitor and a resistor, or a capacitor, a resistor, and a diode.

9. The inverter-integrated electric compressor according to claim 2, wherein the wiring member is a bus bar assembly made by molding a bus bar with a resin.

10. The inverter-integrated electric compressor according to claim 3, wherein the wiring member is a bus bar assembly made by molding a bus bar with a resin.

11. The inverter-integrated electric compressor according to claim 4, wherein the wiring member is a bus bar assembly made by molding a bus bar with a resin.

12. The inverter-integrated electric compressor according to claim 5, wherein the wiring member is a bus bar assembly made by molding a bus bar with a resin.

13. The inverter-integrated electric compressor according to claim 1 further comprising Y capacitors to reflux the outflowing common mode current to the noise source,
   wherein the reflux capacitors flow back the outflowing common mode current to the noise source in a shorter path than the Y capacitors.

14. The inverter-integrated electric compressor according to claim 7 further comprising Y capacitors to reflux the outflowing common mode current to the noise source,
   wherein the reflux capacitors flow back the outflowing common mode current to the noise source in a shorter path than the Y capacitors.

* * * * *